Nov. 17, 1959  R. F. BANNOW  2,912,879
VARIABLE LEVERAGE JOY STICK FOR FEEDING WORK
Filed Feb. 2, 1956  3 Sheets-Sheet 1
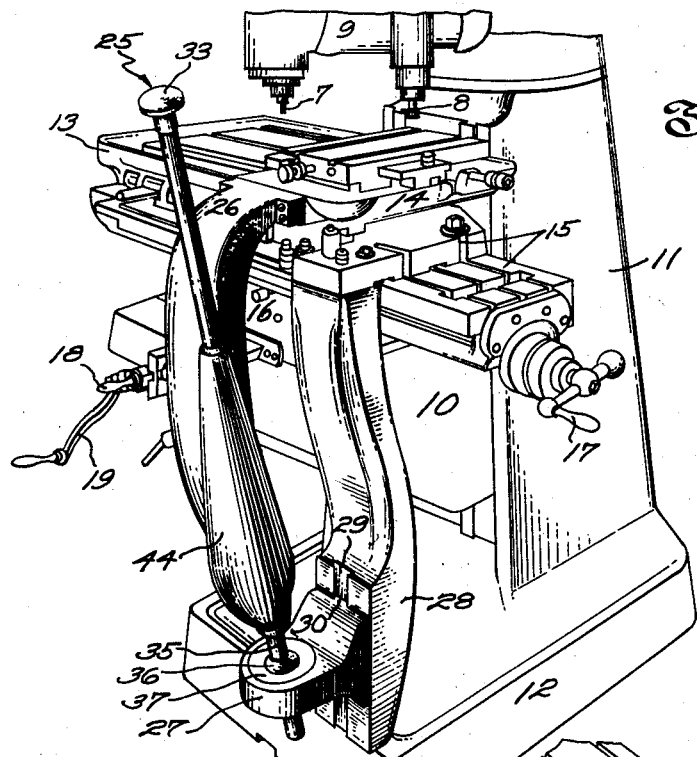
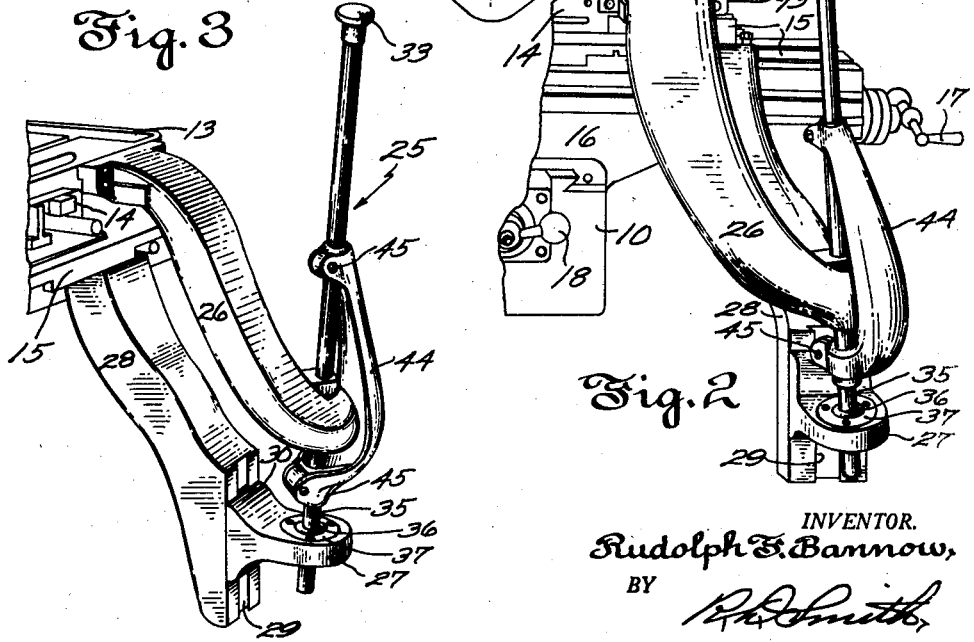
INVENTOR.
Rudolph F. Bannow,
BY
ATTORNEY

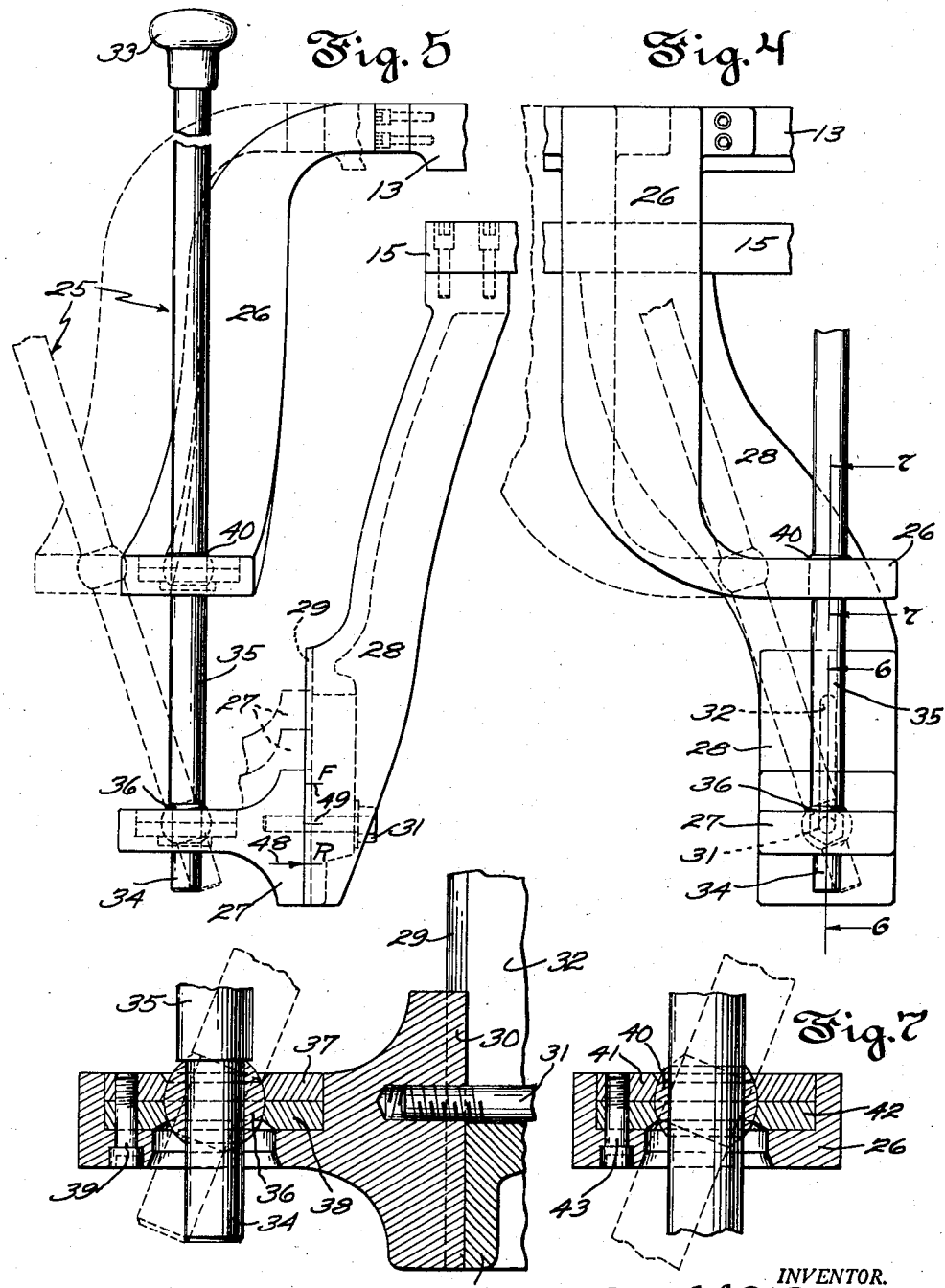

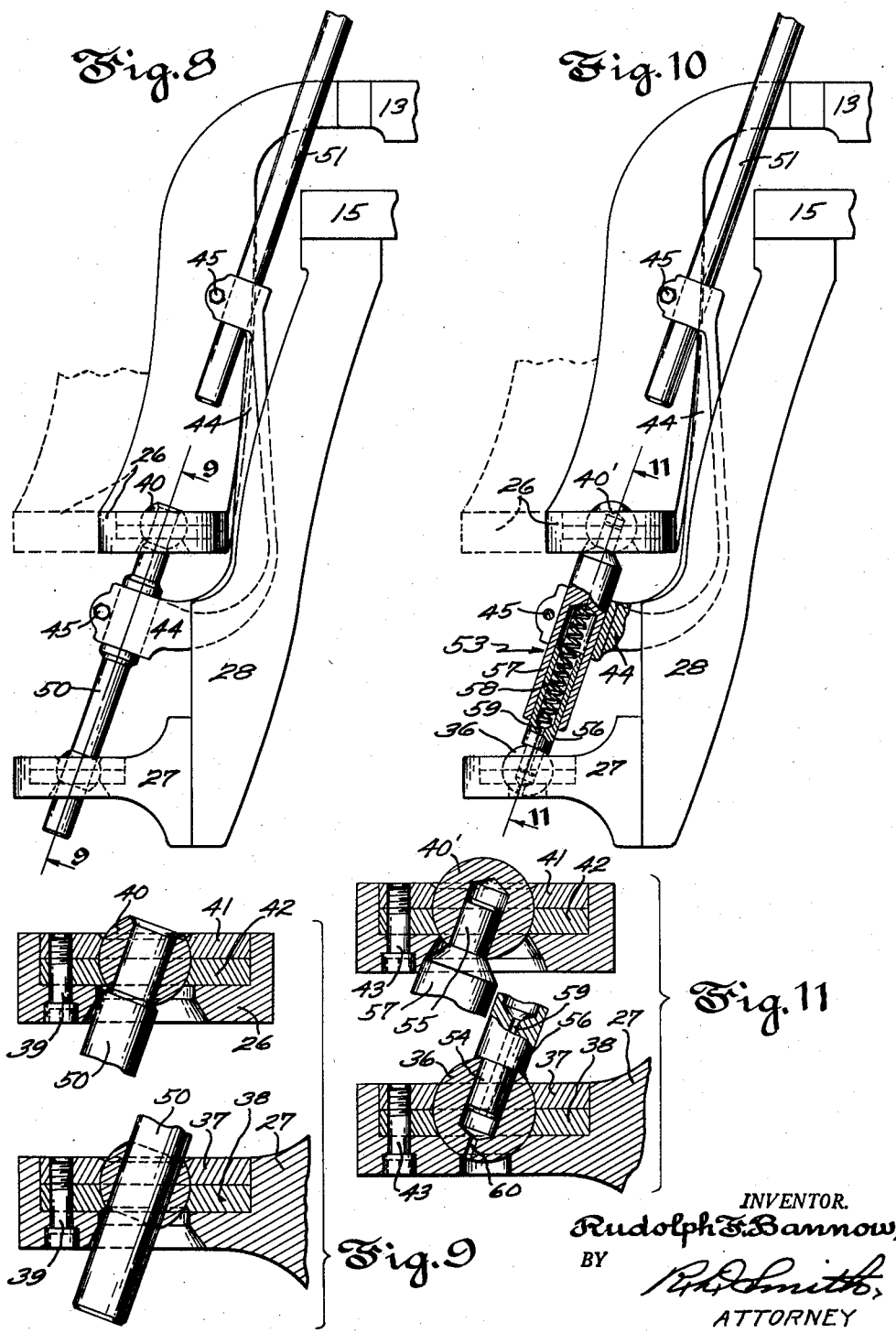

United States Patent Office 2,912,879
Patented Nov. 17, 1959

2,912,879

VARIABLE LEVERAGE JOY STICK FOR FEEDING WORK

Rudolph F. Bannow, Easton, Conn., assignor to Bridgeport Machine, Inc., Bridgeport, Conn., a corporation of Connecticut Application February 2, 1956, Serial No. 563,135

7 Claims. (Cl. 74—525)

This invention relates to machine construction for controlling the feeding of a workpiece against a stationary rotary cutter in a machine tool, such as a milling machine, where the workpiece is carried on a sensitive table mounted to be freely movable in universal directions in a horizontal plane. Control of the feeding of work in universal directions is needed in duplicating or profiling machines which incorporate a stationary pilot or stylus located in spaced fixed relation to the cutter so as to be hunted by the contours of a pattern which is usually fastened on the same sensitive table as the workpiece. Pattern and workpiece are manually moved in unison for generating in the workpiece a shape that duplicates the pattern contour.

It has heretofore been proposed in the manual control of work feeding movement of sensitive tables that there be employed a swingable, upstanding, handle-equipped rod tiltable about a stationary fulcrum point through various angles of slant in universal directions. Because this is a characteristic of control lever operation that is well known in aircraft, such a combined steering and actuating rod may appropriately be termed a "joy stick." Its pivotal mounting, as heretofore proposed in machine tools, has been such as to limit to a constant range of dimensions the effective lever-arm length and hence the mechanical advantage of the joy stick handle in acting upon the sensitive work carrying table.

An object of the present invention is to make variable at will the effective lever-arm length of a joy stick handle for actuating a sensitive table in a machine tool. Thus by these improvements a given distance of table movement can be produced by a relatively small or by a relatively large angle of throw or tilting movement of the joy stick about its fulcrum point. A joy stick having this benefit of selectively variable leverage can impart either finely controlled, forceful feeding movement to the sensitive table or less finely controlled and speedier movement thereto according to the choice of the operator and the demands of the work being machined.

Heretofore in roughing out a work blank, where feeding of the work against the cutting tool does not require close adherence to pattern contours, it has been proposed to immobilize the parts of the sensitive table against movement by the joy stick in order that the work may be fed only by two-handed manipulation of the usual two hand wheels that screw-feed the usual slides of a conventional milling machine in respectively crossing directions. In contrast to this cumbersome two-handed way of rough feeding the work blank the present improvements make possible by single handed operation of the same joy stick both fast feeding of the work blank through relatively long distances for preliminary course cutting operations and much finer control of work feeding for making finishing cuts that require the pattern contours to be followed with care and precision.

These and other objects and advantages of the present improvements will be evident in fuller particular from the following description of successful embodiments of the invention, having reference to the appended drawings wherein:

Fig. 1 is a perspective view of a milling machine of the pattern duplicating type equipped with a variable throw joy stick according to the invention stiffened by a reinforcing yoke.

Figs. 2 and 3 are fragmentary views looking at the joy stick of Fig. 1 from different directions.

Fig. 4 is a front view and Fig. 5 a side view of the joy stick with bridging yoke omitted showing the construction of the shiftable fulcrum about which the joy stick swings at a fixed point in its length.

Fig. 6 is a further enlarged fragmentary view taken in section on the plane 6—6 in Fig. 4.

Fig. 7 is a correspondingly enlarged view taken on the plane 7—7 in Fig. 4.

Fig. 8 shows a modified construction of joy stick and its bearings viewed as in Fig. 5.

Fig. 9 is a contracted view of the shank portion of the joy stick of Fig. 8 drawn on an enlarged scale and taken in section on the plane 9—9 therein.

Fig. 10 shows a further modification of construction wherein the shank of the joy stick is telescopically contractable and extensible.

Fig. 11 is a contracted view of the shank portion of the joy stick of Fig. 10 drawn on an enlarged scale and taken in section on the plane 11—11 therein.

The work carrier of my improved pattern duplicating milling machine is a composite structure incorporating relatively movable parts deriving foundation support from structure including the knee 10, standard 11 and base 12 of the machine. It comprises a sensitive table 13 and a sensitive saddle 14, both being freely glidable horizontally in relatively crosswise directions both with respect to each other and with respect to the immediately underlying platten 15 which supports them. Thus when platten 15 is motionless sensitive table 13 with a pattern (not shown) and a workpiece (not shown) secured in fixed relation thereon can be moved in unison in any horizontal direction relatively to the stylus 7 and power driven rotary milling cutter 8 which depend from the head 9 of the machine. Platten 15 is one of the conventional slides of a milling machine that can be screw fed crosswise of the machine in only a straight line relatively to the underlying slide 16 by hand wheel 17, while 16 is another one of the conventional slides that carries the platten 15 and itself is carried by the knee 10 so as to be screw fed relatively thereto in only a straight line forward and backward of the machine by hand wheel 18. Support knee 10, itself, is lowered and raised on a vertical screw post (not shown) by turning hand wheel 19 as usual in milling machines.

The gliding movement of sensitive table 13, and saddle 14 and the means for controlling such movement is of principal concern in the present improvements. By practice of the invention the impelling leverage of the joy stick 25 with respect to sensitive table 13 is made variable at will and affords a choice of causing a relatively large extent of movement or a relatively small extent of movement of the sensitive table by a given degree of tilting movement of the joy stick.

For anti-frictional ease of movement in a horizontal plane the sensitive table 13 of the work carrier is supported and slidably guided on the saddle 14 in rectilinear direction crosswise of the machine by rolling elements which may comprise a series of balls or rollers (not shown) confined in straight raceways. A suitable construction for such guided table support may involve an endless procession of traveling bearing balls constructed as disclosed in U.S. Patent No. 2,005,696. By silmilar means of guiding support as shown in said patent the saddle 14 may be confined to to-and-fro rectilinear movement on the platten 15 at right angles to the crosswise direction of movement of sensitive table 13.

According to the present improvements sensitive table 13 is equipped with a depending offset stiff arm 26 bolted rigidly to the edge of the table and whose free end occupies a level somewhat elevated above a fulcrum block 27. A bearing holder or fulcrum block 27 is stationed in vertically adjustable position on the lower end of a fulcrum bracket 28 which depends from and is rigid with the platten 15. As mounting means for permitting vertical adjustment of block 27, the front vertical face of the lower end of bracket 28 contains a vertically extending dove-tail guide groove 29 engaged by a groove fitting tongue 30 on block 27 which permits vertical adjustment of the latter on bracket 28, such adjustment being securely maintained by a clamp bolt 31 that passes through a vertically elongated slot 32 in bracket 28 and threads into block 27.

In Figs. 1 through 7 a reduced end portion 34 of the shank 35 of joy stick 25 extends through a fulcrum bearing ball 36. The shoulder 33, formed at the junction of end portion 34 and shank 35, rests on the top of the ball which latter is turnable about its own center in universal directions while confined within a spherically contoured bearing socket formed by separable upper and lower retaining rings 37 and 38, respectively. The shank portion 34 may be made fast in or may swivel relatively to the fulcrum ball and at its top is equipped with a knob handle 33. Rings 37 and 38 are nested in a counterbore in block 27 and are secured thereto as well as held together by means of fastening bolts 38 so as to fix the location of fulcrum ball 36 while permitting free turning thereof. Thus in effect ball 36 and its bearing socket constitute a universal joint or pivotal bearing affording a fulcrum serving to couple joy stick 25 to the saddle 14. The ability of fulcrum ball 36 and the joy stick 25 to swing in unison is illustrated by full and broken lines in Fig. 6.

Shank 35 continues upward from fulcrum ball 36 and extends with a free sliding fit centrally through another bearing ball 40 herein referred to as an impellable universal pivotal bearing as shown in Fig. 7. Ball 40 is turnable about its own center in universal directions while confined within a spherically contoured bearing socket formed by separable upper and lower retaining rings 41 and 42 respectively. These rings are nested in a counterbore in the lower end of arm 26 of the sensitive table 13 and are secured thereto as well as held together by means of fastening bolts 43 so as to permit free turning of ball 40 in the manner of ball 36. Thus ball 40 and its bearing socket constitute an impellable universal pivotal bearing deriving support from means including the sensitive table at a level of horizontal movement spaced vertically from the fulcrum affording pivotal bearing aforesaid.

A rigid reinforcing yoke 44 clamps firmly by means of bolts 45 to the joy stick both above and below the lower end of table extension 26 and bridges the latter widely enough to freely permit full swinging movement of the joy stick. This adds to the firmness of control of work feeding table movement by eliminating any possibility of slight deflection in the joy stick, although as shown in Figs. 4 and 5 the bridging yoke 44 may be omitted.

Adjustive settings of the vertical position of fulcrum block 27 can be indicated by the registering of an index mark 48 on the side surface of the block with graduations 49 on the bracket 28. Thus in maneuvering the joy stick for making a roughing cut of the work blank, index 48 may be placed in register with graduation "R" at which setting of the fulcrum block the joy stick will impel the sensitive table a relatively far distance corresponding to the angle through which the joy stick is swung. If block 27 is raised so that index 48 registers with graduation "F" the sensitive table will be impelled a considerably less distance in response to the same angle of throw of the joy stick.

In Figs. 8 and 9 a modification of the construction is shown wherein the shank 50 of the joy stick does not continue upward beyond the bearing ball 40 but terminates thereat and is fixed thereto by riveting over a reduced top end of the shank against the ball. Here, however, the lower end portion of shank 50 has a free and unrestricted sliding fit through the fulcrum ball 36. Also in Figs. 8 and 9 the bridging yoke 44 serves not merely to reinforce the stiffness of the joy stick but serves also as the sole rigid coupling between stick shank 50 and the handle portion 51 of the joy stick.

In Figs. 10 and 11 the bridging yoke 44 and handle portion 51 of the joy stick are constructed as in Figs. 8 and 9, but the shank 53 has tenons 54, 56 at each of its ends nested in sockets in the modified bearing balls 36' and 40', respectively. Shank 53 comprises two telescopically engaged members 56, 57 each hollow and containing under lengthwise compression a spring coil 58. Shank member 56 and fulcrum ball 36' contain air escape orifices 59 and 60, respectively. Thus the overall length of shank 53 can expand or contract to accommodate itself to variation of distance between bearing balls 36' and 40' as the joy stick is operated in any one of the variable vertical positions of fulcrum block 27 on the bracket 28.

In the appended claims the sensitive table 13 is referred to as having supporting structure including saddle 14 which permits the table to perform gliding movement in universal directions in a horizontal plane, and the arm 26 by means of which the table is moved is termed a table extension. Bearing ball 36 is an example of a fulcrum affording element or bearing referred to in the claims and for which the fulcrum block 27 is a holder shiftable in relation to the table supporting structure and stayed in its variable positions by the fastening bolt 31.

Many other modifications of shapes, combination and arrangement of parts additional to those herein illustrated and described may be characterized by the underlying principles of these improvements and the appended claims are therefore directed to the invention in the broadest sense of their wording.

I claim:

1. An actuating mechanism for enabling a machine part to be maneuvered in selective planar directions with variable leverage by the swinging movement of a joy stick in universal directions comprising the combination with a joy stick of, an impellable pivotal bearing impellably engaged by said joy stick impellingly related to the machine part to be maneuvered and confined to bodily movement in a horizontal plane at a fixed level, a pivotal fulcrum bearing engaged by said joy stick at a distance therealong spaced from said floating bearing, a bracket carrying said fulcrum bearing in firmly stationed locations variably spaced from said horizontal plane, and frame structure on which said bracket is shiftably mounted in a manner to be fixedly held at selective different levels with respect to said horizontal plane, said joy stick being at least in part longitudinally slidable in relation to one of said bearings thereby to accommodate the shifting of said bracket to said different selective levels.

2. An actuating mechanism as defined in claim 1 in which the said joy stick is longitudinally slidable in relation to the said impellable pivotal bearing.

3. An actuating mechanism as defined in claim 1 in which the said joy stick is longitudinally slidable in relation to the said fulcrum bearing.

4. An actuating mechanism as defined in claim 1 in which the said joy stick includes a rod of fixed length extending continuously from the said fulcrum bearing to and past its point of impellable engagement with the said impellable bearing.

5. An actuating mechanism as defined in claim 1, in which at least one of the said pivotal bearings includes a ball, together with separable retaining rings cooperatively contoured to form a partially spherical socket rotatably imprisoning said ball, each of said rings containing an aperture positioned and sufficiently large to permit the said joy stick to extend therethrough at various angles of inclination.

6. An actuating mechanism as defined in claim 5, together with a bridging yoke fixed to the said rod both above and below the said impellable pivotal bearing.

7. An actuating mechanism as defined in claim 6, in which the said yoke is a tapering body channeled lengthwise having its concave side facing and flanking the said impellable pivotal bearing.

References Cited in the file of this patent

UNITED STATES PATENTS

| | | |
|---|---|---|
| 2,005,696 | Gorton | June 18, 1935 |
| 2,111,471 | Henkes | Mar. 15, 1938 |
| 2,557,056 | Schlein | June 12, 1951 |

UNITED STATES PATENT OFFICE

CERTIFICATE OF CORRECTION

Patent No. 2,912,879                          November 17, 1959

Rudolph F. Bannow

It is hereby certified that error appears in the above numbered patent requiring correction and that the said Letters Patent should read as corrected below.

In the grant, lines 2 and 12, and in the heading to the printed specification, lines 4 and 5, name of assignee, for "Bridgeport Machine, Inc." read -- Bridgeport Machines, Inc. --.

Signed and sealed this 2nd day of August 1960.

(SEAL)

Attest:

KARL H. AXLINE
Attesting Officer

ROBERT C. WATSON
                                                   Commissioner of Patents